Sept. 16, 1941. M. B. REACH Re. 21,901

INFLATED BALL

Original Filed April 2, 1936 2 Sheets-Sheet 1

Inventor:

Milton B. Reach,

By Spear, Danielson & Hall

Attorneys.

Sept. 16, 1941. M. B. REACH Re. 21,901

INFLATED BALL

Original Filed April 2, 1936 2 Sheets-Sheet 2

Inventor:

Milton B. Reach,

By Spear, Donaldson & Hall

Attorneys.

Reissued Sept. 16, 1941

Re. 21,901

UNITED STATES PATENT OFFICE 21,901

INFLATED BALL

Milton B. Reach, Springfield, Mass.

Original No. 2,211,669, dated August 13, 1940, Serial No. 72,397, April 2, 1936. Renewed July 15, 1940. Application for reissue January 22, 1941, Serial No. 375,521

17 Claims. (Cl. 154—16)

The object of this invention is to provide a leather covered inflated ball to relatively exact specifications without recourse to the use of heavy expensive leather for its strength and sustaining qualities and to permit the use of economic units of leather whereby small panels can be easily fitted to the rounded surface of the ball and suitably united and secured against the wear and action of the ball in play.

Another object of this invention is to eliminate uneven wall thicknesses, occasioned in a prior method by the turned-in edges of leather or fabric or both in the ordinary stitching operations, to insure a more even rebound from impact at different parts of the ball.

Another object is to avoid the weakness resulting from the use of stitching in fabricating the body of the ball.

Another object is to provide reasonably cheap leather covered balls that will retain form and size with the use of leather from the poorer parts of the hide, which parts ordinarily are subject to stretch and distortion under common methods of use.

One common practice of making inflated balls of the class herein referred to consists of cutting out from the best parts of the hide (for the good balls), panels of leather of correct pattern, lining these panels with fabric backing, machine stitching the panels together inside out leaving an opening large enough to reverse the ball through, thereafter closing said opening, with hand stitching or lace, following the placement of the bladder.

These methods call for careful selection of material with a considerable by-product resultant from the cutting thereof which may be absorbed in cheaper inferior playing balls or used in another class of merchandise.

I propose to overcome the objections of present day manufacture by the following novel methods which I have selected as possibly yielding the most uniform results without recourse to highly skilled labor.

Figure 1:
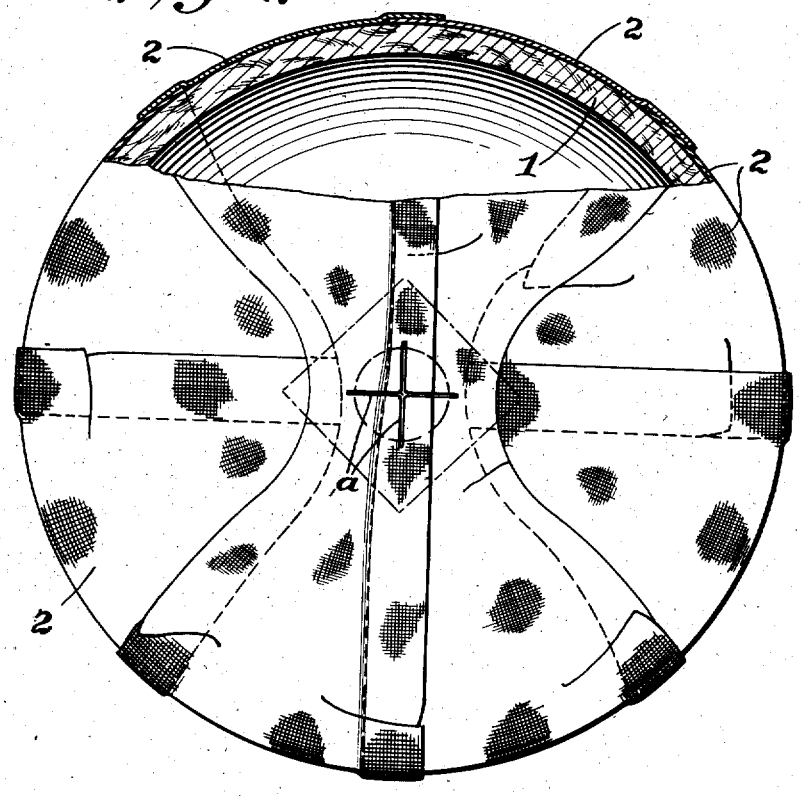
Figure 1 is a view of a part of the ball structure built upon a form of wax, the view being partly in elevation and partly in section.
Figure 2:
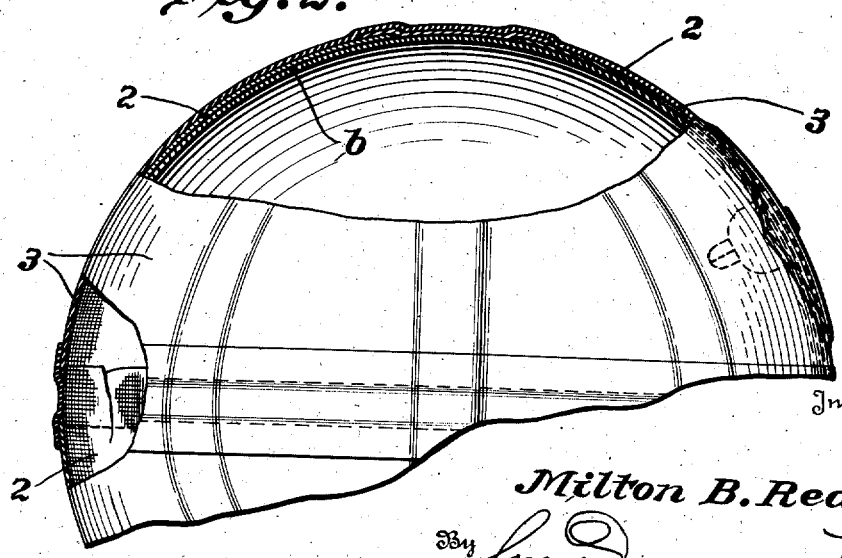
Fig. 2 shows another stage in the process, only a portion of the ball, as thus far formed, being shown, and this being in section, the wax form having been removed from the interior of the ball as thus far completed.
Figure 3:
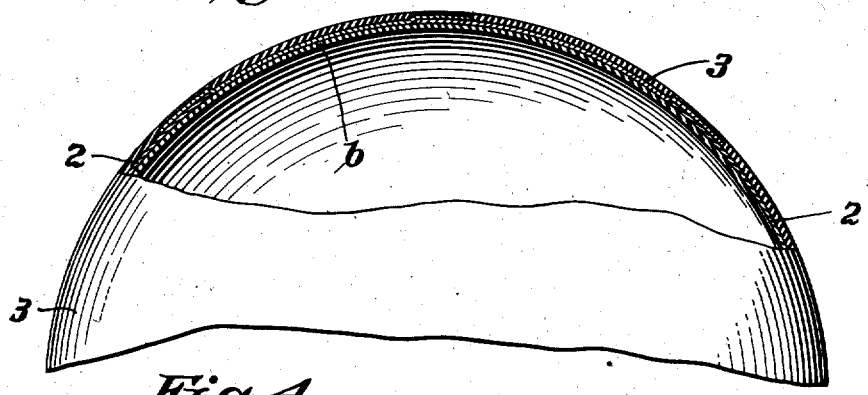
Fig. 3 is a view similar to Fig. 2, but showing a subsequent stage in the manufacture of the ball.
Figure 4:
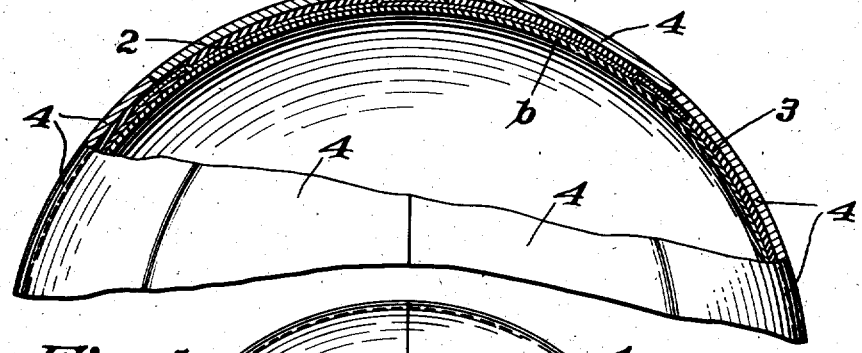
Fig. 4 is a view similar to Figs. 2 and 3 showing the final stage in the making of the ball as having been completed.
Figure 5:
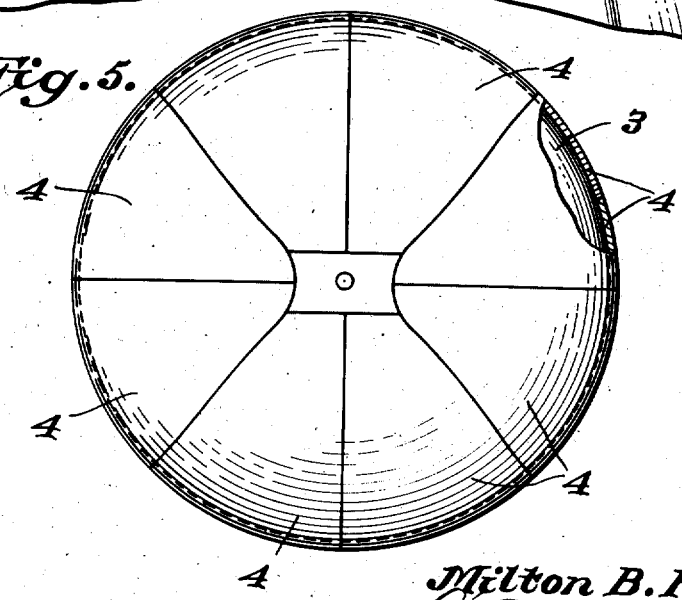
Fig. 5 is an elevation of the completed ball.

First I place in a suitably designed mould sufficient hot wax to form a hollow ball 1 with walls approximately $\frac{1}{16}''$ thick. Thereafter I cover this wax with a thin coat of rubber or similar gum. Upon that I lay laminations of textile fabric 2 of suitable pattern and size, said fabric being impregnated or coated with rubber or similar material capable of bonding the parts together. This fabric may be in the form of strips or panels overlapping or crossing each other and cemented together. This fabric is laid firm and tight on the wax ball, all of which are of uniform mould. Thereafter I cut a hole or slit *a* in the fabric of about one inch in extent and through the wax, through which is passed a steam nozzle and the wax is melted out for reuse leaving a uniformly formed fabricated foundation member. At this stage I insert the bladder member *b* with its valve and I then close the hole or slit in the case with a suitable patch. This patch is applied by the use of a vulcanizing cement to reinforce this part of the ball from the strain of internal pressure. Due to the overlapping of the various fabric parts a rough uneven form results.

I therefore cover this foundation member with a thin sheet of rubber 3 and subject it in a mold to a quick forming cure during which the rubber flows and fills the uneven parts. This produces a smooth rubber surfaced ball ready to receive its leather veneer 4. This veneer or outer layer or covering consists of leather pieces, preferably three or more in number, selected for color and weight, all pieces being split or skived to even and standard thicknesses, which are now laid on the rubber surface, said surface being prepared with a suitable cement, the inside surface and edges of leather pieces being likewise treated. The pieces of leather are butted edgewise closely one to another. The covered ball is now placed in a mold for its final moulding operation and all parts of the wall integrally bonded together under pressure and moderate heat.

The leather pieces may be skived to produce bevelled edges which may be rolled down in bonded relation with the underlying rubber surface. This is not claimed herein but forms the subject matter of my copending application Serial No. 203,915, filed April 23, 1938.

The invention is not limited to the specific steps mentioned. Thus instead of "ironing" the leather pieces onto the foundation by a molding operation, this can be done by the application of external air packs. Nor do I limit myself to the specific kind of initial removable base upon which the textile material is fabricated to produce the foundation as a removable ball like base other than wax may be employed.

I do not limit myself to the use of woven textile fabric. The fabric is relatively non-stretchable.

Any desired form of filling valve may be used. It has the capacity to close automatically when the filling nozzle is withdrawn after the ball has been inflated.

Access to the valve is had through an opening in the patch and superposed layers of rubber and leather.

Briefly stated the method involves the following steps.

The application of textile fabric pieces in more or less overlapping or crossing relation to the rubber or similar gum coated surface of a hollow form of wax, said laminations being impregnated with material for bonding them together; cutting an opening or slit in said textile wall and the wax form; melting out the wax by a steam nozzle introduced through said opening, inserting a bladder through said opening and inflating it, said bladder having a self closing valve of any known form; placing a reinforcing patch over the opening in the said fabric wall, except for a small opening necessary to allow access to be had to the valve; applying a coating to the rough or uneven surface of the laminated or built up textile wall capable of filling the depressions in said wall and of producing a smooth exterior surface; subjecting the ball as thus far produced to a quick forming cure in a mold to make said coating flow for producing said exterior surface; and then cementing leather pieces in edge to edge relation to the said smooth exterior surface of the inflated foundation, in a molding operation under pressure and moderate heat to integrally bond said leather pieces to the foundation wall.

The coating of rubber which is applied to the fabric foundation, desirably, may consist of sheet rubber in the form of two cups, which, while of general hemispherical shape, are slightly short of reaching to the true equatorial line, or, in other words, are spaced apart slightly at their adjacent edges, and are connected with each other by a center band of rubber overlapping the edges of the cups.

I claim:

1. The hereindescribed steps in a method of producing an inflated ball consisting in building up a textile wall of the ball upon a form, reducing and removing the material of said form through an opening in the said wall, inserting a bladder through said wall opening into the ball thus far formed, applying rubber material to the exterior of said textile wall, vulcanizing the ball thus far formed in a mold to unite the rubber material to the textile wall and produce a smooth even exterior surface, then uniting leather panels with the rubber exterior of the ball by heat and pressure, substantially as described.

2. Steps in the method according to claim 1, together with the additional step of applying a patch to the opening in the textile wall after the bladder has been inserted, the said step of applying rubber material to the exterior of the textile wall including applying said rubber material also to the exterior of the patch, substantially as described.

3. Steps in a method of making an inflated ball comprising applying unsewn pieces of textile material outside out to a substantially rigid form together with bonding material to provide a textile carcass, reducing and removing the material of the form from the carcass, and inserting a bladder in its place and inflating the bladder against the interior of the carcass, curing the carcass and applying a cover to the carcass.

4. Steps in a method of making inflated playing balls comprising forming an unsewn carcass with a substantially unstretchable wall including textile fabric applied outside out, together with bonding material upon a rigid form, reducing and removing the material of said form through an opening in the carcass, curing said carcass in a mold, and then completing the formation of the ball by cementing a cover on the carcass and subjecting the ball to a molding operation under pressure and moderate heat, substantially as described.

5. Steps in a process of making an inflatable game ball comprising building an unsewn carcass by applying laminations of textile material and bonding material upon a substantially rigid integral form of reducible material and of a predetermined size and shape, in an assembly to produce a composite non-stretchable flexible wall, reducing the material of said form and removing it through an opening in said carcass, sealing the opening to resist internal pressure and prevent distortion of the wall at this point and curing the components of the wall into a substantially homogeneous body, substantially as described.

6. Steps in a method according to claim 5 together with the additional step of cementing cover material in unstitched sections to the non-stretchable carcass which previously has been inflated to receive said cover material.

7. Steps in a process of making an inflatable ball according to claim 5 in which the initial layer of textile material is laid in an adhesive relation to the form to prevent slippage of the initial layer in said relationship.

8. Steps in a process of making an inflatable ball according to claim 5 in which the initial layer of textile material is laid in an adhesive relation to the form and each succeeding layer is laid in adhesive relationship one to another to prevent any disturbance or change of relationships as initially established in the assembly operations.

9. Steps in a process according to claim 5 in which the layers of textile material overlap, applying rubber to the uneven surface of the overlapping layers and moulding for making said rubber flow to provide an even exterior surface and applying cover sections to said surface, substantially as described.

10. Steps in a process according to claim 5 with which a bladder is employed to inflate the carcass, said bladder having been inserted following the removal of the reduced material composing the integral form.

11. Steps in a method of making an inflatable game ball comprising building a non-stretchable carcass of laminations of textile fabric laid upon a rigid form of fusible material, melting the form and removing the melted material from the carcass through an opening therein, applying a patch to said opening to close the same, inflating the carcass to the shape and size it acquired from the rigid form, and cementing a cover of pieces of sheet material to the carcass and over the patch thereof, substantially as described.

12. Steps in a method of making an inflatable game ball according to claim 11 in which the first lamination of textile fabric is secured adhesively to the fusible form and the subsequent layer or layers are bonded to the first layer, substantially as described.

13. Steps in a method of making an inflatable game ball comprising building a non-stretchable carcass of textile fabric upon a hollow rigid form of homogeneous material, reducing the material of the form to a condition for the removal of said material from the carcass, through an opening therein, closing said opening by a patch cemented in place, inflating the carcass to the limit determined by its non-stretchable character to the shape and size acquired from the rigid form, and cementing pieces of sheet material to the carcass and over the patch thereof to form a cover, substantially as described.

14. Steps in a method of making an inflatable game ball according to claim 13 in which the first lamination of textile fabric is secured adhesively to the form, and the subsequent lamination is bonded to the first, the reduction of the material of the form separating it from its adherent relation to the carcass, substantially as described.

15. Steps in a process of making an inflatable game ball consisting in applying a coating of adhesive material to a rigid form, which form is of material capable of reduction, building a carcass by applying textile material to the form to be held by said adhesive material against slippage, during the building operation, said textile material having associated therewith material for bonding it into a homogeneous non-stretchable wall, reducing the form and removing its reduced material from the carcass as built up thereon, inserting a bladder through an opening in the carcass, closing the opening, inflating the bladder, vulcanizing the carcass and cementing cover pieces to the exterior of the carcass and over the closed opening, substantially as described.

16. A process according to claim 15 in which after the cover pieces are applied to the carcass the ball is subjected to pressure and moderate heat, substantially as described.

17. A method of making a hollow inflatable playing ball which comprises forming a wall by laying sections of fabric material upon an inner support with the marginal edges of the fabric material in overlapping relation with each other so that thickened seams are formed, applying a rubber coating over the entire outer surface of the fabric, and curing the wall in a mold with heat applied externally and pressure applied internally of the wall, so that the rubber coating will flow and the thickened seams will be embedded in the rubber coating, the internal and external surfaces of the wall being smooth and free of protuberances so that the wall is of uniform thickness throughout.

MILTON B. REACH.